(12) United States Patent
Heesch

(10) Patent No.: US 6,857,590 B2
(45) Date of Patent: *Feb. 22, 2005

(54) FISHING REEL SPOOL

(76) Inventor: Christian Heesch, 1565 Wagon Wheel, Cottonwood, AZ (US) 86326

( * ) Notice: Subject to any disclaimer, the term of this patent is extended or adjusted under 35 U.S.C. 154(b) by 0 days.

This patent is subject to a terminal disclaimer.

(21) Appl. No.: 10/644,075

(22) Filed: Aug. 19, 2003

(65) Prior Publication Data

US 2004/0113006 A1 Jun. 17, 2004

Related U.S. Application Data

(63) Continuation-in-part of application No. PCT/US02/16778, filed on May 29, 2002, which is a continuation of application No. 09/867,185, filed on May 29, 2001, now Pat. No. 6,609,671, application No. 10/644,075, which is a continuation-in-part of application No. 09/867,185.
(60) Provisional application No. 60/217,890, filed on Jul. 12, 2000.

(51) Int. Cl.[7] .............................................. A01K 89/00
(52) U.S. Cl. .................... 242/322; 242/586; 242/587.2; 242/609.3; 242/613
(58) Field of Search ................................ 242/322, 579, 242/586, 587, 587.2, 587.3, 609.2, 609.3, 613

(56) References Cited

U.S. PATENT DOCUMENTS

| | | |
|---|---|---|
| 969,146 A | 8/1910 | Soule |
| 1,761,750 A | 6/1930 | Schafer |
| 1,855,738 A | 4/1932 | Case |
| 2,309,146 A | 1/1943 | Whistler |
| 2,525,169 A | 10/1950 | Dodge |
| 2,573,240 A | 10/1951 | Berlinger |
| 2,669,400 A | 2/1954 | Wood |
| 2,696,951 A | 12/1954 | Wood |
| 2,777,648 A | 1/1957 | Wood |
| 3,201,059 A | 8/1965 | Winkel |
| 3,329,367 A | 7/1967 | Pradiso |
| 3,442,464 A | 5/1969 | Broos |
| 3,536,275 A | 10/1970 | Salomon |
| 3,743,208 A | 7/1973 | Schmitz |
| 3,905,561 A | 9/1975 | Kelch et al. |
| 3,940,085 A | 2/1976 | Campbell |
| 3,977,429 A | 8/1976 | Stevenson |
| 4,103,843 A | 8/1978 | Nothdurft |
| 4,196,864 A | 4/1980 | Cole |
| 5,120,003 A | 6/1992 | Sacconi |
| 5,165,623 A | 11/1992 | Smith |
| 5,195,699 A | 3/1993 | Stinnette |
| 5,381,981 A | 1/1995 | Nelson |
| 5,507,443 A | 4/1996 | Miyazaki |
| 6,015,111 A | 1/2000 | Berke |
| 6,241,181 B1 | 6/2001 | Campbell |
| 6,609,671 B2 | 8/2003 | Heesch |

FOREIGN PATENT DOCUMENTS

| | | |
|---|---|---|
| CA | 577885 | 6/1959 |
| GB | 565901 | 12/1944 |

*Primary Examiner*—Emmanuel Marcelo
(74) *Attorney, Agent, or Firm*—Garvey, Smith, Nehrbass & Doody, LLC; Charles C. Garvey, Jr.

(57) ABSTRACT

A spool design for fishing reels is disclosed, allowing for the reversible separation of the spool into different parts for the easy removal of old fishing line and wherein a specially configured aperture is exposed upon separation of the spool parts, allowing for the introduction of one end of the line into the interior of the spool. The line can be attached to the inside of the spool, providing for a secure fastening of the line without exposure of the knot to the exterior of the spool.

29 Claims, 6 Drawing Sheets

FISHING REEL SPOOL

CROSS-REFERENCE TO RELATED APPLICATIONS

This is a continuation in part of U.S. patent application Ser. No. 09/867,185 filed May 29, 2001, now U.S. Pat. No. 6,609,671), which itself claimed priority to U.S. Provisional Patent Application Ser. No. 60/217,890, filed Jul. 12, 2000, both of which are incorporated herein by reference.

Priority of U.S. Provisional Patent Application Ser. No. 60/217,890, file Jul. 12, 2000, is hereby claimed.

This is a continuation in part of PCT patent application Ser. No. PCT/US02/16778, having international filing date May 29, 2002, which in the U.S. was a continuation of U.S. patent application Ser. No. 09/867,185, filed May 29, 2001 now U.S. Pat. No. 6,609,671, both of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to fishing reels and spool constructions, more particularly to fixed-spool (spinning) reels and an improved configuration for a fixed-spool (spinning) reel spool.

2. General Background of the Invention

Fixed-spool reels (commonly referred to as spinning reels) are currently the most popular reels used for sport fishing world-wide. While many different makes and models are offered to accommodate the varying needs of fishing enthusiasts, the basic design of most spinning reels is similar. Particularly, the spool of spinning reels, which serves to store the fishing line wound up by the reel, shows little variation between different models.

The casting distance that can be achieved with a given type of line and lure is largely dependent on the design of the spool. Many modern spinning reel spools feature a wide center portion, and are elongated and slightly cone-shaped, in an attempt to minimize line friction during the casting process. Typically, the line is fastened to these spools by attaching it firmly to the center portion of the spool with a knot. This mode of line attachment, however, leads to several problems common to spinning reels.

First, most of the knots used for line attachment are fairly bulky, since no angler wishes to risk the loss of a sizeable fish due to the loosening of the knot attaching the line to the spool. This knot, and the line end typically protruding from it, may significantly interfere with the even layering of the line wound subsequently on the spool, thereby decreasing the accuracy and distance achievable during the casting process. The more the spool is elongated, and the more its center portion is wide, the more will the body of the knot be located in proximity to the outer layers of the line. This partially offsets the advantages in casting distance and accuracy gained by modern spool design.

Second, inelastic lines with little inherent stretch, particularly modern braided lines, are difficult to attach firmly to the center portion of most spools. This problem increases at lower temperatures. In these situations, cranking the handle of the reel will not lead to the taking up of line, but rather to the rotation of the entire coil of line around the spool.

Third, the process of removing old line from the spool is cumbersome. The line has to be manually pulled off from the spool, foot by foot, a time consuming and frustrating process that leaves a large heap of tangled line. Since many fishermen are put off by the prospect of the time consuming and boring process of line changing, many a "big one" gets away due to the breaking of old, damaged line.

Fourth, while an attempt to circumvent the above listed problems by hiding the knot inside the spool would solve some of the above problems, a new problem arises: Spinning reels, by universal design, are indeed "fixed spool reels", and are often referred to as such. They depend on the ability of the spool to change from a generally fixed attachment on the reel shaft assembly to rotational movements around that shaft when a strong fish sets the drag mechanism, preventing line breakage, in motion. Any such attempts to hide the knot inside the spool have to provide means to prevent any possibility of interference of the knot or parts of the fishing line with the rotational movements of the spool around the reel shaft assembly.

These considerations make it apparent that there exists the need for a new type of spinning reel spool, allowing not only for the quick removal of old line, but also for the firm attachment of new line, without the possibility of line loosening at the attachment site, or the possibility of interference of the knot with the casting process, or the possibility of interference of the knot or parts of the fishing line with the drag mechanism.

DESCRIPTION OF THE PRIOR ART

U.S. Pat. No. 6,015,111 to Berke describes a spool having a detachable flange for removing damaged line. The Berke patent does not relate to a fishing reel spool construction but rather to a separate line winding tool.

U.S. Pat. No. 5,507,443 to Miyazaki discloses a notch in the barrel of a spool, for securing line.

U.S. Pat. No. 5,195,699 to Stinnette teaches a spool that can be separated in two parts for line removal. The spool design does not offer any internal line attachment features. Moreover, the claims of the Stinnette patent demand that the spool have a parabolic contour, a feature that may facilitate line removal, but which is certain to interfere with the casting process, and which runs counter to the slightly conical mid-section design of modern spools intended for long-range casting.

U.S. Pat. No. 5,165,623 to Smith describes a fishing reel spool containing an elongated opening, generally parallel to the spool axis, with multiple smaller orthogonal side openings. Securement of line to the spool occurs through wedging of a preformed knot at the end of the line into smaller orthogonal portions of the longitudinal slot. Separation of the line from the spool is possible through retrograde movements of the line and detachment of the preformed knot from its wedged position.

U.S. Pat. No. 5,120,003 to Sacconi discloses a fishing reel spool which can be threadably separated, and a cartridge spool which contains line and which fits over a first spool axle, both spools being reversibly locked together by a locking detent. The fishing reel spool is not designed to take up line directly without a cartridge spool.

U.S. Pat. No. 4,196,864 to Cole teaches a line winding tool including a take-up spool with removable flange for removing line from a conventional fishing reel spool.

U.S. Pat. No. 4,103,843 to Nothdurft teaches a fishing reel design which includes a spool and cover both having an aperture. The fishing line is passed through both apertures and then knotted at the outside of the cover of the spool.

U.S. Pat. Nos. 2,777,648; 2,696,951; and 2,669,400 to Wood describe an arbor, to be mounted on the shaft of a conventional fishing reel spool, containing apertures for attachment of fishing line.

U.S. Pat. No. 2,309,146 to Whistler teaches a spool with a transverse bore through a hub portion and a spindle for passing one end of a fishing line to be wound on said spool.

U.S. Pat. No. 2,525,169 to Dodge, entitled "Cork Hub", issued Oct. 10, 1950.

BRIEF SUMMARY OF THE INVENTION

The present invention provides a spinning reel and spool arrangement, wherein the spool is of two parts, an upper part, and a lower part. These parts can be assembled or taken apart using a simple mechanism of external and internal threads. Removal of old line now becomes very quick and hassle free: the two segments filled with line are simply taken apart, leaving immediately a neat coil of old line that can be discarded easily.

In addition, one of the two segments of the spool features a small opening at the site of attachment of the opposing segment. This opening is used to introduce the end of the line, which is then attached to a small wire loop on the inner surface of that same spool segment. This will lead to a secure connection of the line to the spool, eliminating possible gliding of the entire coil of line around the spool. The knot of the connection is hidden inside the spool, avoiding all interference of the knot with the smooth separation of line from the spool during the casting process. Since the knot is firmly attached to the interior of the spool, it cannot slip out of the opening.

By modifying the spool structure, the invention, iter alia, substantially shortens the process of line removal, provides for a secure connection of the line to the spool, and eliminates possible interference of the knot with the casting process.

A feature of the present invention is that the spool can be taken apart in a plurality of segments for easy line removal. The spool described uses a simple threading mechanism to join the two segments of the spool. An additional conventional locking mechanism could be used to prevent all accidental loosening of the connection, and/or any other conventional locking mechanism could be used instead of the threads to join the spool segments.

Another feature of the present invention is that the line is attached firmly to structural parts of the spool center, and not simply wound around the spool, thus preventing the slipping of the entire line coil. The invention described here uses a single opening and a wire loop connector at the inside of the spool for the fastening of the line. Multiple variations of this, using one or more openings, and/or various devices for the attachment of the line, could be used.

Another feature of the present invention is that the knot of the line connection is hidden inside the spool, thus avoiding possible interference with the casting process, yet being firmly connected to the spool, avoiding potential separation of the line end from the spool that may be caused by backward movements of the line.

Yet another feature of the present invention is that the knot, and those parts of the line which are located inside the spool, are separated from the shaft, upon which the spool is mounted. This assures that there is no possibility of interference of the knot or the fishing line with the main shaft and its attached components if the drag mechanism is put in motion when a big fish is played.

BRIEF DESCRIPTION OF THE DRAWINGS

For better clarity, the illustrations do not feature any of the usual details at the upper and lower ends of the spool, nor its connection to the spool shaft or the drag system. These parts and details vary significantly between the many types and brands of spinning reels, yet they are of no particular importance to understand the this improved spool and reel design.

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 5:
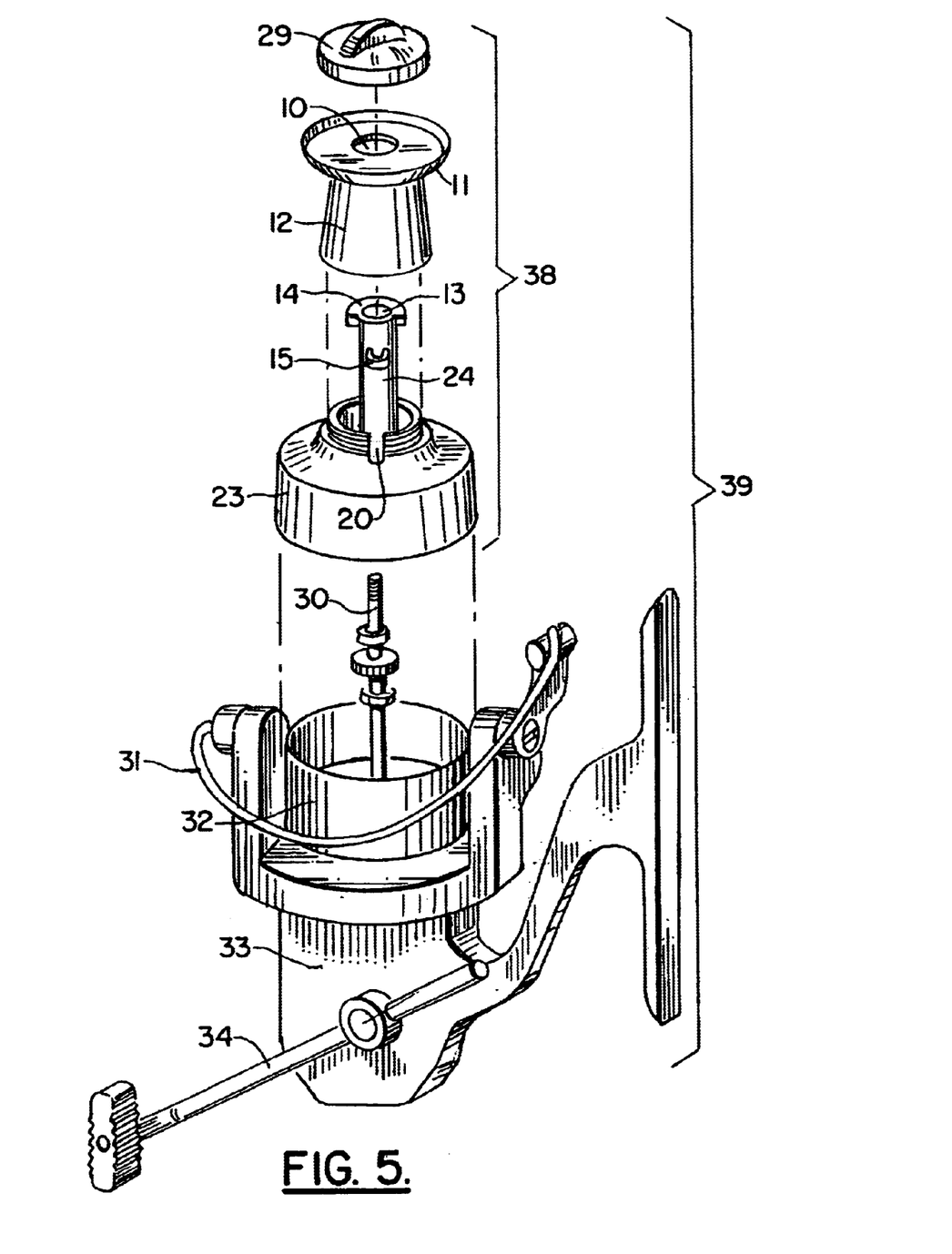
FIG. 5 is an exploded perspective view of the disassembled parts of the spool, and their position in relation to a spinning reel, on which they are mounted.
Figure 6:
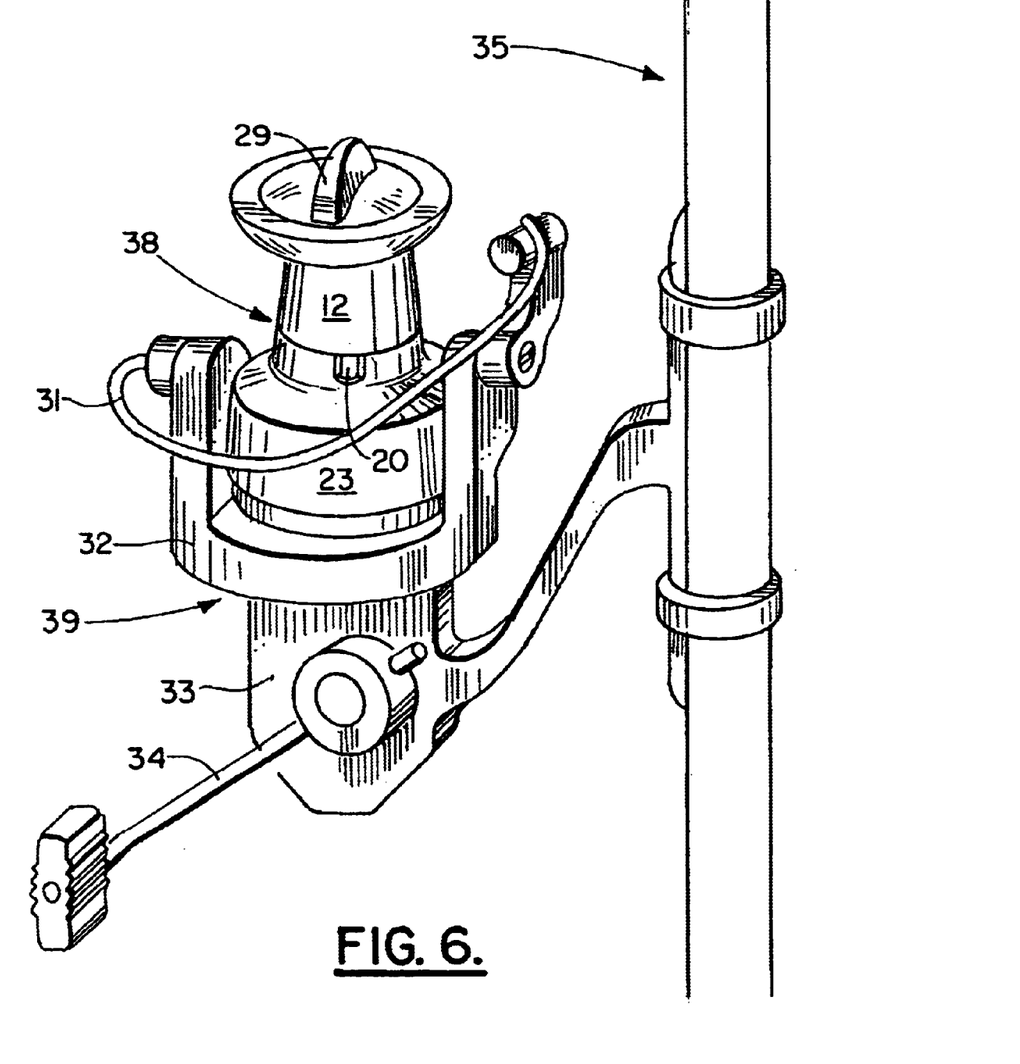
FIG. 6 shows a spinning reel featuring the spool, mounted on a fishing rod.

FIGS. 5 and 6 depict the preferred embodiment of the apparatus of the present invention, designated generally by the numeral 39.

Figure 1:
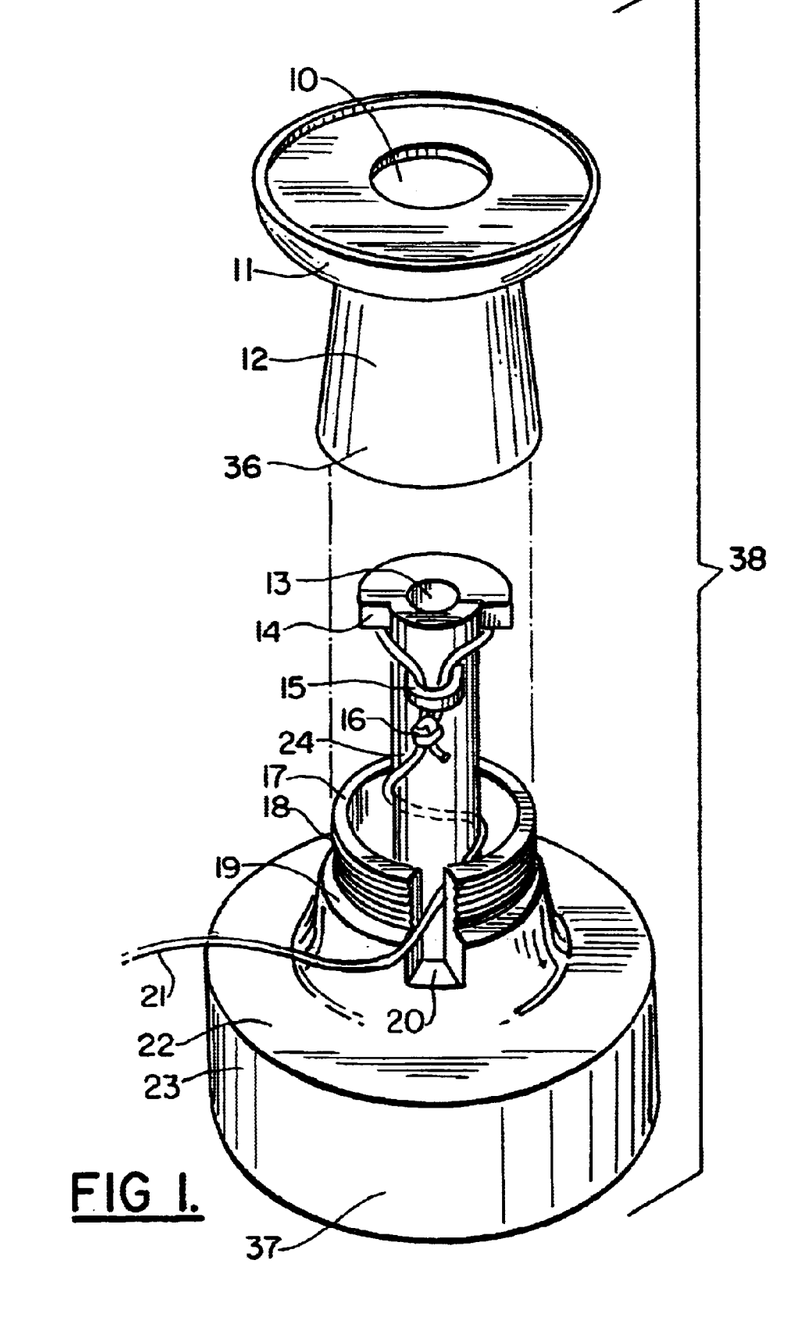
FIG. 1 is an exploded perspective view of a preferred embodiment of the apparatus of the present invention showing the separated parts of the spool, as well as the end of fishing line being attached to the spool.

FIG. 1 shows the separated parts of the spool 38, including distal part 36, and proximal part 37. Distal part 36 features a central aperture 10, allowing part 36 to fit over middle tube 24 of proximal part 37. Distal part 36 features distal flange 11 and middle section 12 of spool 38. Proximal part 37 and distal part 36 connect reversibly via external threads 18 and internal threads 25 of the proximal 37 and distal 36 spool parts, respectively.

In FIG. 1, a middle tube 24 is provided on proximal part 37. Line attachment loop 15 allows fishing line 21 to be secured to proximal part 37 by means of a knot 16. At its distal end, middle tube 24 features end piece 14. Line 21 exits spool 38 via line aperture 20.

Of note, while aperture 20 has been depicted with edges, to improve clarity of the drawing, it should be emphasized that smooth contours of aperture 20 are essential to avoid damage to line 21. Once line 21 has been attached to attachment loop 15, it is lead out of proximal part 37 via line aperture 20. Distal part 36 is then reversibly attached to proximal part 37 through threads 18, 25. As is evident from this and subsequent figures, this assembly prevents knot 16 from coming into contact with either the exterior of spool 38, or with main shaft assembly 30 (FIG. 5), on which spool 38 is mounted.

Figure 2A:
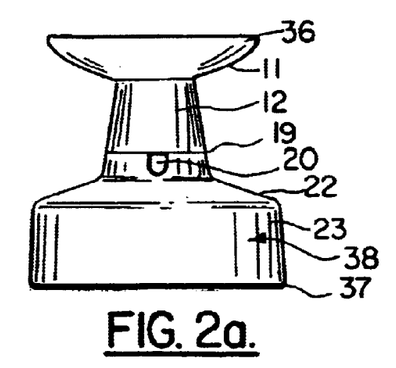
FIG. 2a is an end view of the assembled parts of the spool.

FIG. 2a shows distal 36 and proximal 37 parts of spool 38 assembled. Spool 38 resembles a traditional spool 26, spool 38m featuring an elongated middle section 12, and smooth proximal 22 and distal 11 flanges, and, proximally, a skirted spool section 23. Separation line 19 marks where parts 36 and 37 are reversibly joined. Adjacent and below separation line 19, line aperture 20 is visible.

Figure 2B:
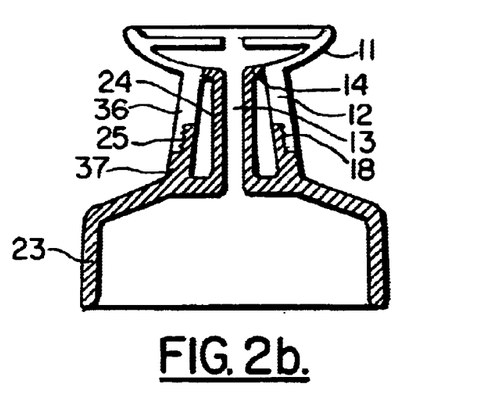
FIG. 2b is a sectional end view of the spool.

FIG. 2b is a sectional view of spool 38 shown in FIG. 2a. Note that end piece 14 of middle tube 24 can be flush with the interior surface of distal part 36.

Figure 2C:
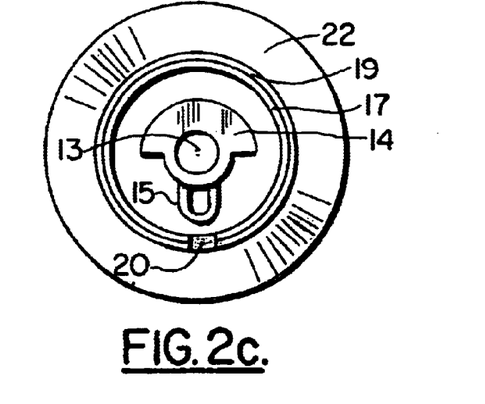
FIG. 2c is a top view of the lower portion of the spool.
Figure 2D:
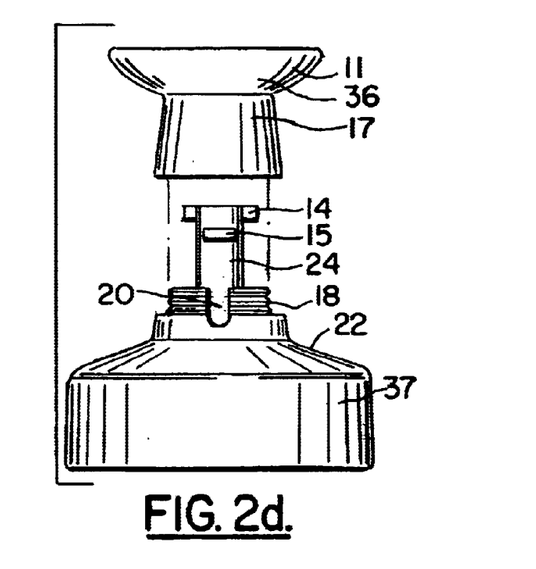
FIG. 2d is an end view of the separated parts of the spool.
Figure 2E:
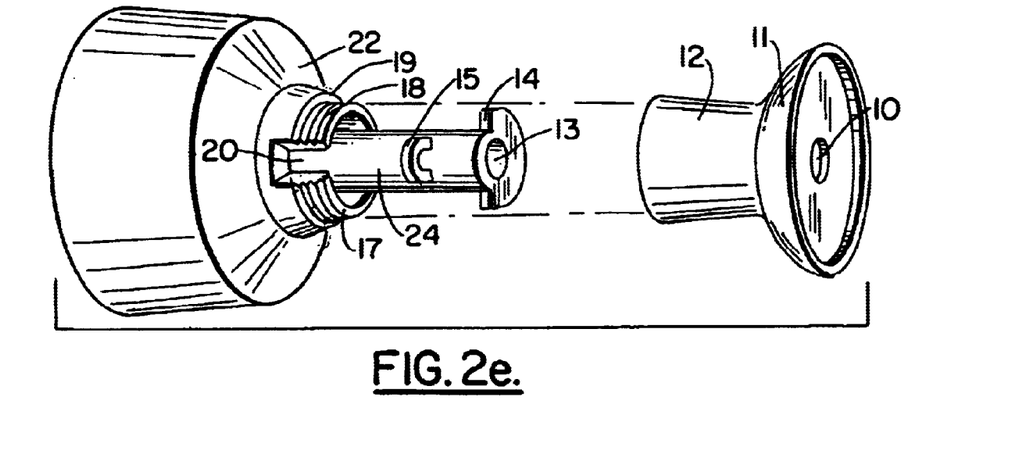
FIG. 2e is an exploded perspective view of the separated parts of the spool.

FIG. 2c shows proximal part 37 from the top. Easily seen are central aperture 13 of middle tube 24 (which can receive main shaft assembly 30 as shown in FIG. 5), as well as end piece 14, attachment loop 15, distal rim 17 of proximal threaded portion 18, separation line 19, and proximal flange 22. FIGS. 2d and 2e show these same parts when separated, using and end view and an exploded perspective view, respectively.

Figure 3A:
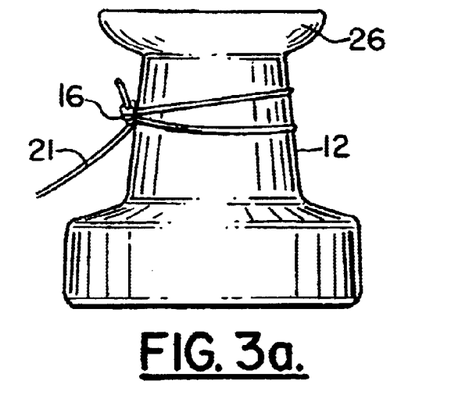
FIG. 3a is an end view of a traditional spool, showing the attachment of line.
Figure 3B:
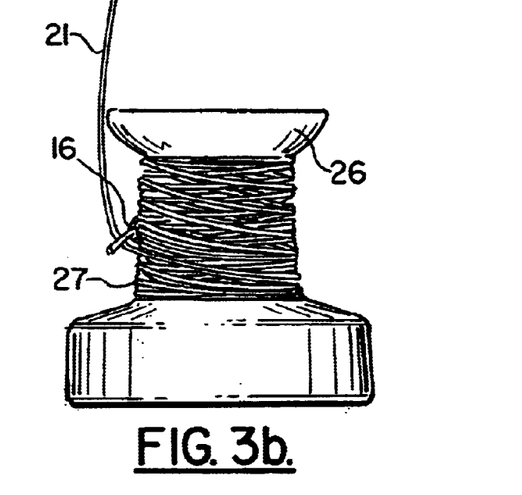
FIG. 3b is an end view of a traditional spool, showing several layers of line.

FIGS. 3a–d compare the line attachment to a traditional spool 26 (FIGS. a–b) with the attachment of line to spool 38, illustrating one of the advantages of the invention. Traditional spool 26, as depicted in FIG. 3a, features, like most modern spools, a fairly elongated and wide middle section 12, allowing for less friction during the casting process. Using this elongated and wide middle section, the diameter of layer 27 of fishing line 21 wound around the spool is relatively thin. Knot 16 therefore occupies significant space in relation to layer 27. FIG. 3b illustrates that, during long distance casts, when lower layers of line 21 are exposed, knot 16 actually hinders line 21, as it is paid out rapidly in a direction parallel to the long axis of spool 26.

Figure 3C:
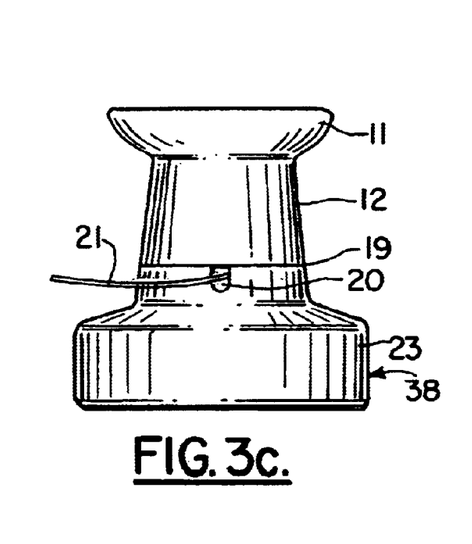
FIG. 3c is an end view of the spool, showing the attachment of line.
Figure 3D:
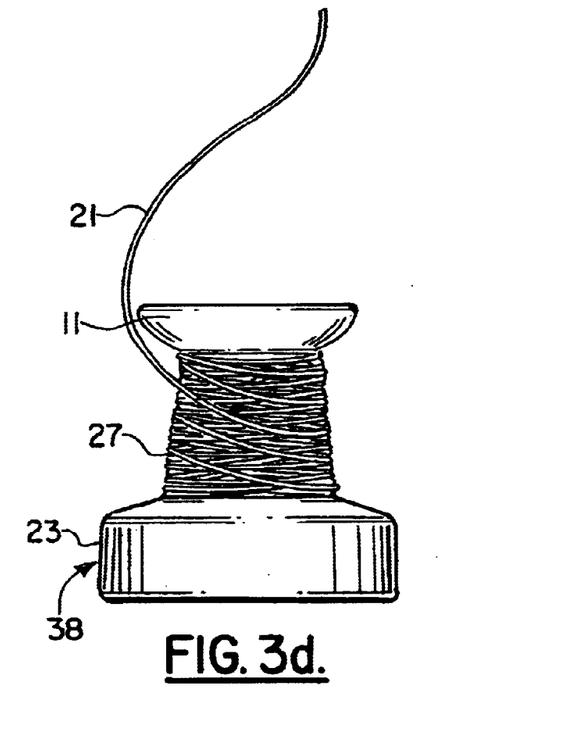
FIG. 3d is an end view of the spool, showing several layers of line.

FIGS. 3c and 3d feature that same process of line attachment and line payout for spool 38. As illustrated in FIG. 3c, shape and contour of spool 38 resemble traditional spool 26, however, knot 16 now is hidden inside spool 38. Therefore, there is no possibility of interference of knot 16 with line 21, and the casting process, as shown in FIG. 3d, becomes smooth and unobstructed.

Figure 4A:
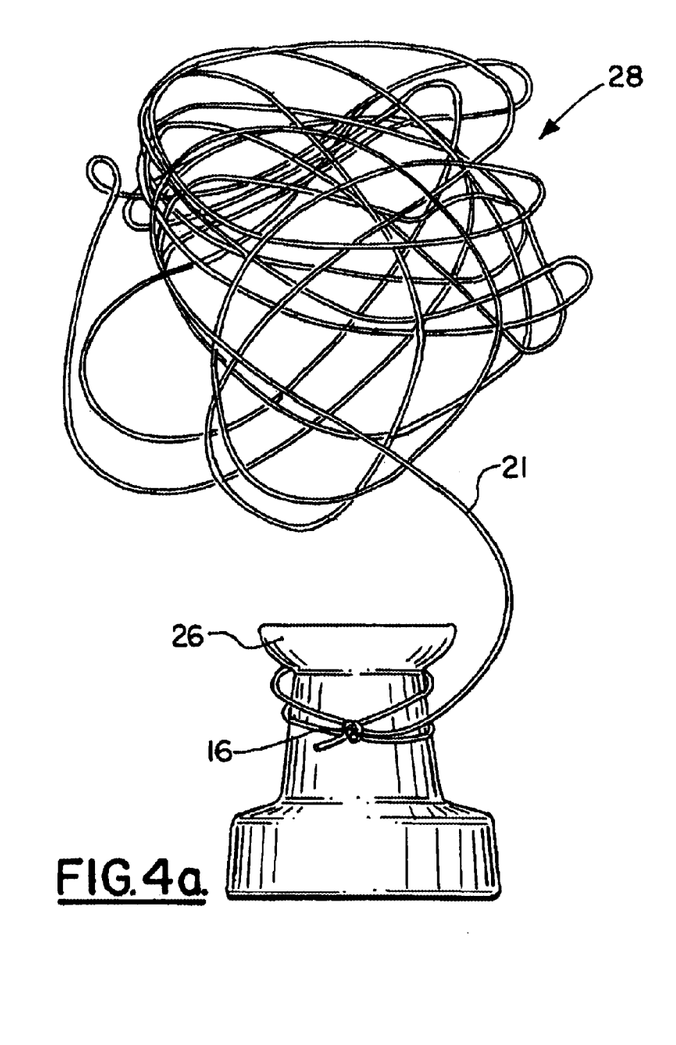
FIG. 4a is an end view of a traditional spool, showing the process of line removal therewith.
Figure 4B:
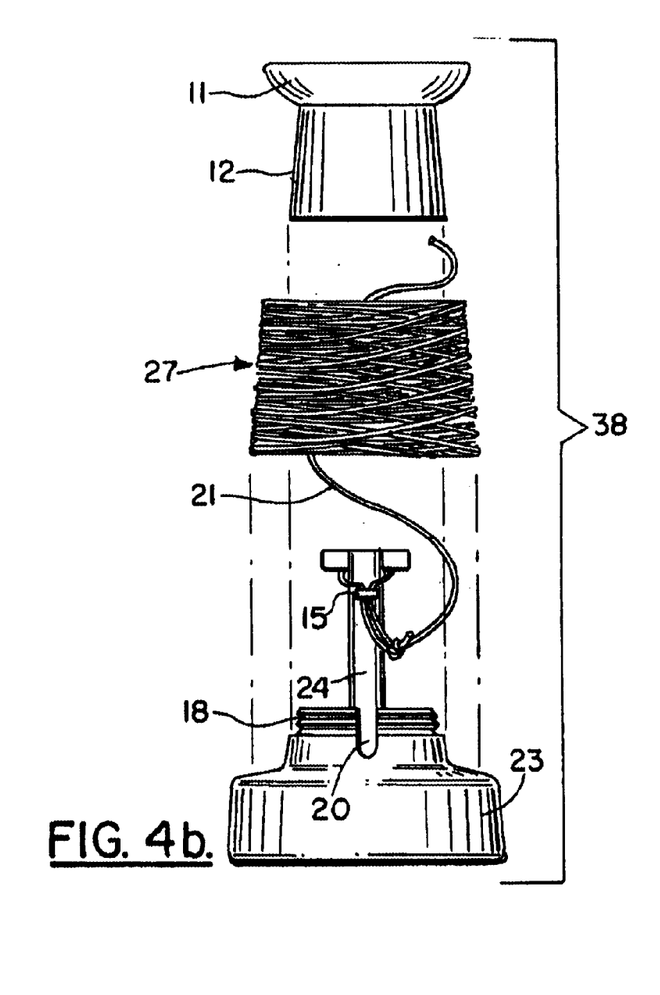
FIG. 4b is an end view of the separated parts of the spool, showing the process of line removal.

FIG. 4 compares the process of line removal from a traditional spool 26 (FIG. 4a), and from the new and improved spool 38 (FIG. 4b). Line 21 has to be stripped off traditional spool 26 by hand, leading to the formation of a voluminous entanglement of fishing line, known to fishermen by the slang term "birds nest" 28, and to aggravation of the fisherman. Moreover, since this discarded line 21 is difficult to store, some unscrupulous anglers will leave bird's nest 28 behind in nature, where it may entangle and kill wildlife. FIG. 4b shows the removal process with spool 38. It is remarkably quick and easy to operate as a few turns will separate distal part 36 from proximal part 37, leaving a neat coil of layers 27 of fishing line 21 for easy and space saving disposal.

FIG. 5 shows spool 38 in relation to standard parts of a spinning reel 39. Like traditional long-skirted spools, spool 38 fits with its skirted section 23 over the corresponding portion of rotor 32. Middle tube 24 receives main shaft assembly 30, thereby effectively separating line 21, attached to loop 15 on the exterior of middle tube 24, from central aperture 13, which defines the interior of middle tube 24. Should therefore a big fish put the drag mechanism in motion, an event that will not fail to happen, given new reel 39's multiple advantages, spool 38 will rotate without interference of line 21 or knot 16 with main shaft assembly 30. Please note that standard items necessary to effectively secure spool 38 on main shaft assembly 30, such as washers, nuts, and retainers, are not depicted for clarity.

FIGS. 5 and 6 depict improved fishing reel apparatus 39 including spool 38 mounted on fishing reel apparatus 39, and fishing reel apparatus 39 assembled with a fishing rod 35.

Parts List

The following is a list of suitable parts and materials for the various elements of the preferred embodiment of the present invention.

| Parts Number | Description |
| --- | --- |
| 10 | central aperture of spool |
| 11 | distal flange of spool |
| 12 | middle section of spool |
| 13 | central aperture of middle tube |
| 14 | end piece of middle tube |
| 15 | line attachment loop |
| 16 | knot |
| 17 | distal rim of lower threaded portion |
| 18 | threads of proximal part of spool |
| 19 | separation line between proximal and distal spool parts |
| 20 | line aperture |
| 21 | fishing line |
| 22 | proximal flange of spool |
| 23 | skirted section of spool |
| 24 | middle tube |
| 25 | threads of distal part of spool |
| 26 | traditional spool |
| 27 | layers of fishing line |
| 28 | bird's nest |
| 29 | drag knob |
| 30 | main shaft assembly |
| 31 | bail arm |
| 32 | rotor |
| 33 | reel body |
| 34 | handle assembly |
| 35 | fishing rod |
| 36 | distal part of spool |
| 37 | proximal part of spool |
| 38 | spool and spinning reel apparatus |
| 39 | improved fishing reel |
| 40 | fishing apparatus |

The foregoing embodiments are presented by way of example only; the scope of the present invention is to be limited only by the following claims.

What is claimed is:

1. A spool for a fixed-spool fishing reel or spinning reel, comprising:

a) an annular spool body section having attached thereto a first and a second spool end, the first spool end forming a first flange, and the second spool end forming a second flange;

b) said spool being able to be separated into two parts at a connection position generally in between the flanges;

c) each of said parts having a first and a second end;

d) each of said parts having one of said flanges attached thereto when separated from each other;

f) a cavity inside the spool having a line attachment for attaching thereto a length of line to be wound on said spool body;

g) an opening in at least one of the body parts that communicates with said cavity;

h) said opening enabling an end of fishing line to pass into said cavity; and i) said cavity having means to spatially separate said end of fishing line from any parts of said spinning reel upon which said spool is mounted, thereby enabling said spool to engage in rotational movements in relation to said spinning reel without interference by said end of fishing line.

2. A spool for a fixed-spool fishing reel or spinning reel, comprising:

a) a spool body section in the shape of a truncated cone, having attached thereto a first and a second spool end, the first spool end forming a first flange, and the second spool end forming a second flange;

b) said first spool end suited for mounting on a spinning reel, said second spool end suited for the payout of fishing line over its flange in a direction along the axis of said spool;

c) said spool body section in the shape of a truncated cone having its larger diameter adjacent to said first spool end, and its smaller diameter adjacent to said second spool end;

d) said spool being able to be separated into two parts at a connection position generally in between the flanges; and e) each of said parts having one of said flanges attached thereto when separated from each other.

3. A spool for a fixed-spool or spinning reel as in claim 2, comprising:

a) a cavity inside said spool having a line attachment for attaching thereto a length of line to be wound on the spool body;

b) an opening in at least one of the body parts that communicates with said cavity;

c) said opening enabling an end of fishing line to pass into said cavity; and d) said cavity having means to spatially separate said end of fishing line from any parts of said spinning reel upon which said spool is mounted, thereby enabling said spool to engage in rotational movements in relation to said spinning reel without interference by said end of fishing line.

4. A spool for a fishing reel as in claim 2, further comprising:

a) a cavity inside said spool having a line attachment for attaching thereto a length of line to be wound on the spool body;

b) an opening in at least one of the body parts that communicates with said cavity;

c) said opening enabling an end or fishing line to pass into said cavity; and d) said cavity having means to spatially separate said end of fishing line from any parts of said spinning reel upon which said spool is mounted, thereby enabling said spool to engage in rotational movements in relation to said spinning reel without interference by said end of fishing line.

5. A spool for a fixed-spool fishing reel or spinning reel, comprising:

a) a spool body section in the shape of a cylinder, having attached thereto a first and a second spool end, the first spool end forming a first flange, and the second spool end forming a second flange;

b) said first spool end suited for mounting on a spinning reel, said second spool end suited for the payout of fishing line over its flange in a direction along the axis of said spool;

c) said spool being able to be separated into two parts at a connection position generally in between the flanges; and d) each of said parts having one of said flanges attached thereto when separated from each other.

6. A spool for a fixed-spool or spinning reel as in claim 5, comprising:

a) a cavity inside the spool having a line attachment for attaching thereto a length of line to be wound on the spool body;

b) an opening in at least one of the body parts that communicates with said cavity;

c) said opening enabling an end of fishing line to pass into said cavity;

d) said cavity having means to spatially separate said end of fishing line from any parts of said spinning reel upon which said spool is mounted, thereby enabling said spool to engage in rotational movements in relation to said spinning reel without interference by said end of fishing line.

7. A spool for the reel of claim 5, further comprising:

a) a cavity inside the spool having a line attachment for attaching thereto a length of line to be wound on the spool body;

b) an opening in at least one of the body parts that communicates with said cavity;

c) said opening enabling an end of fishing line to pass into said cavity;

d) said cavity having means to spatially separate said end of fishing line from any parts of said reel upon which said spool is mounted, thereby enabling said spool to engage in rotational movements in relation to said reel without interference by said end of fishing line.

8. A spinning reel and spool apparatus comprising:

a) a spinning reel body having means to mount a spool, and a mechanism for winding fishing line on said spool;

b) said spool comprising an annular spool body section having attached thereto a first and a second spool end, the first spool end forming a first flange, and the second spool end forming a second flange;

c) said spool being able to be separated into two parts at a connection position generally in between the flanges;

d) each of said parts having a first and a second end;

e) each of said parts having one of said flanges attached thereto when separated from each other;

f) a cavity inside said spool having a line attachment for attaching thereto a length of line to be wound on the spool body;

g) an opening in at least one of the body parts that communicates with said cavity;

h) said opening enabling an end of fishing line to pass into said cavity; and i) said cavity having means to spatially separate said end of fishing line from any parts of said spinning reel upon which said spool is mounted, thereby enabling said spool to engage in rotational movements in relation to said spinning reel without interference by said end of fishing line.

9. A spinning reel and spool apparatus comprising:
   a) a spinning reel body having means to mount a spool, and a mechanism for winding fishing line on said spool;
   b) said spool having a spool body section in the shape of a truncated cone, having attached thereto a first and a second spool end, the first spool end forming a first flange, and the second spool end forming a second flange;
   c) said first spool end suited for mounting on said spinning reel body, said second spool end suited for the payout of fishing line over its flange in a direction along the axis of said spool;
   d) said spool body section in the shape of a truncated cone having its larger diameter adjacent to said first spool end, and its smaller diameter adjacent to said second spool end;
   e) said spool being able to be separated into two parts at a connection position generally in between the flanges; and
   f) each of said parts having one of said flanges attached thereto when separated from each other.

10. A spinning reel and spool apparatus as in claim 9, comprising:
    a) a cavity inside said spool having a line attachment for attaching thereto a length of line to be wound on the spool body;
    b) an opening in at least one of the body parts that communicates with said cavity;
    c) said opening enabling an end of fishing line to pass into said cavity; and
    d) said cavity having means to spatially separate said end of fishing line from any parts of said spinning reel upon which said spool is mounted, thereby enabling said spool to engage in rotational movements in relation to said spinning reel without interference by said end of fishing line.

11. A spinning reel and spool apparatus comprising:
    a) a spinning reel body having means to mount a spool, and a mechanism for winding fishing line on said spool;
    b) said spool comprising a spool body section in the shape of a cylinder, having attached thereto a first and a second spool end, the first spool end forming a first flange, and the second spool end forming a second flange;
    c) said first spool end suited for mounting on said spinning reel body, said second spool end suited for the payout of fishing line over its flange in a direction along the axis of said spool;
    d) said spool being able to be separated into two parts at a connection position generally in between the flanges; and
    e) each of said parts having one of said flanges attached thereto when separated from each other.

12. A spinning reel and spool apparatus as in claim 11, comprising:
    a) a cavity inside said spool having a line attachment for attaching thereto a length of line to be wound on the spool body;
    b) an opening in at least one of the body parts that communicates with said cavity;
    c) said opening enabling an end of fishing line to pass into said cavity;
    d) said cavity having means to spatially separate said end of fishing line from any parts of said spinning reel upon which said spool is mounted, thereby enabling said spool to engage in rotational movements in rotation to said spinning reel without interference by said end of fishing line.

13. A spool for a fixed-spool fishing reel or spinning reel, comprising:
    a) a spool body having a first and a second spool end, the first spool end providing a first flange, the second spool end providing a second flange;
    b) said spool being separable into two parts at a connection position generally in between the flanges;
    c) each of said parts having a first and a second end;
    d) each of said parts having one of said flanges attached thereto when separated from each other;
    e) a cavity inside the spool having a line attachment for attaching thereto a length of line to be wound on said spool body said cavity communicating with each said spool part;
    f) a line opening in at least one of the body parts that communicate with said cavity;
    g) said line opening enabling an end of fishing line to pass into said cavity; and
    h) one of said spool parts having a line anchor that extends into the cavity.

14. The spool of claim 13 wherein one of the spool parts has a hollowed open ended socket that defines at least in part said cavity and the other spool part has a projecting portion that occupies at least part of the open ended socket when spool parts are connected together.

15. The spool of claim 14 wherein the projecting portion has an outer surface that is configured for line to be wound thereupon.

16. The spool of claim 13 wherein the line attachment is on the projecting portion.

17. The spool of claim 13 wherein the spool part with the projecting portion has an annular shoulder with a slot that defines said line opening.

18. The spool of claim 17 further comprising an annular space in between the annular shoulder and projecting part.

19. A spool for a fixed-spool fishing reel or spinning reel comprising:
    a) a spool body having a first and a second spool end, the first spool end providing a first flange, the second spool end providing a second flange;
    b) said spool being separable into two parts at a connection position generally in between the flanges;
    c) each of said parts having a first and a second end;
    d) each of said parts having one of said flanges attached thereto when separated from each other;
    e) a cavity inside the spool having a line attachment for attaching thereto a length of line to be wound on said spool body said cavity communicating with each said spool part;
    f) a line opening in at least one of the body parts that communicates with said cavity;
    g) said line opening enabling an end of fishing line to pass into said cavity; and
    h) one of sad spool parts having a projecting portion that extends into the other spool part.

20. The spool of claim 19 wherein one of the spool parts has a hollowed open ended socket that defines at least in part said cavity and the other spool has a projecting portion that occupies at least part of the open ended socket when the spool parts are connected together.

21. The spool of claim 20 wherein the projecting part has an outer surface that is configured for line to be wound thereupon.

22. The spool of claim 19 wherein the line attachment is on the projecting portion.

23. The spool of claim 19 wherein the spool part with the projecting portion has an annular shoulder with a slot that defines said line opening.

24. The spool of claim 23 further comprising an annular space in between the annular shoulder and projecting part.

25. A spool for a fixed-spool fishing reel or spinning reel, comprising:
   a) a fishing reel;
   b) a spool body having a section in the shape of a truncated cone, having attached thereto a first and a second spool end, the first spool end forming a first flange, and the second spool end forming a second flange;
   c) said first spool end being configured to attach to said reel, said second spool end suited for the payout of fishing line over its flange in a direction along the axis of said spool;
   d) said spool body section in the shape of a truncated cone having its larger diameter adjacent to said first spool end, and its smaller diameter adjacent to said second spool end;
   e) said spool being able to be separated into two parts at a connection positioned generally in between the flanges; and
   f) each of said parts having one of said flanges attached thereto when separated from each other.

26. A spool for a fixed-spool fishing reel, comprising:
   a) a spool body section in the shape of a cylinder, having attached thereto a first and a second spool end, the first spool end forming a first flange, and the second spool end forming a second flange;
   b) said first spool end suited for mounting on a spinning reel, said second spool end suited for the payout of fishing line over its flange in a direction along the axis of said spool;
   c) said spool being able to be separated into two parts at a connection position generally in between the flanges; and
   d) each of said parts having one of said flanges attached thereto when separated from each other.

27. A spinning reel and spool apparatus comprising:
   a) a spinning reel body having means to mount a spool, and a mechanism for winding fishing line on said spool;
   b) said spool comprising an annular spool body section having attached thereto a first and a second spool end, the first spool end forming a first flange, and the second spool end forming a second flange;
   c) said spool being able to be separated into two parts at a connection position generally in between the flanges;
   d) each of said parts having a first and a second end;
   e) each of said parts having one of said flanges attached thereto when separated from each other;
   f) a cavity inside said spool having a line attachment for attaching thereto a length of line to be wound on the spool body;
   g) an opening in at least one of the body parts that communicates with said cavity;
   h) said opening enabling an end of fishing line to pass into said cavity; and
   i) said cavity having means to spatially separate said end of fishing line from any parts of said spinning reel upon which said spool is mounted, thereby enabling said spool to engage in rotational movements in relation to said spinning reel without interference by said end of fishing line.

28. A spinning reel and spool apparatus comprising:
   a) a spinning reel body having means to mount a spool, and a mechanism for winding fishing line on said spool;
   b) said spool having a spool body section in the shape of a truncated cone, having attached thereto a first and a second spool end, the first spool end forming a first flange, and the second spool end forming a second flange;
   c) said first spool end suited for mounting on said spinning reel body, said second spool end suited for the payout of fishing line over its flange in a direction along the axis of said spool;
   d) said spool body section in the shape or a truncated cone having its larger diameter adjacent to said first spool end, and its smaller diameter adjacent to said second spool end;
   e) said spool being able to be separated into two parts at a connection position generally in between the flanges; and
   f) each of said parts having one of said flanges attached thereto when separated from each other.

29. A spinning reel and spool apparatus comprising:
   a) a spinning reel body having means to mount a spool, and a mechanism for winding fishing line on said spool;
   b) said spool comprising a spool body section in the shape of a cylinder, having attached thereto a first and a second spool end, the first spool end forming a first flange, and the second spool end forming a second flange;
   c) said first spool end suited for mounting on said spinning reel body said second spool end suited for the payout of fishing line over its flange in a direction along the axis of said spool;
   d) said spool being able to be separated into two parts at a connection position generally in between the flanges; and
   e) each of said parts having one of said flanges attached thereto when separated from each other.

* * * * *